United States Patent Office 2,815,180
Patented Dec. 3, 1957

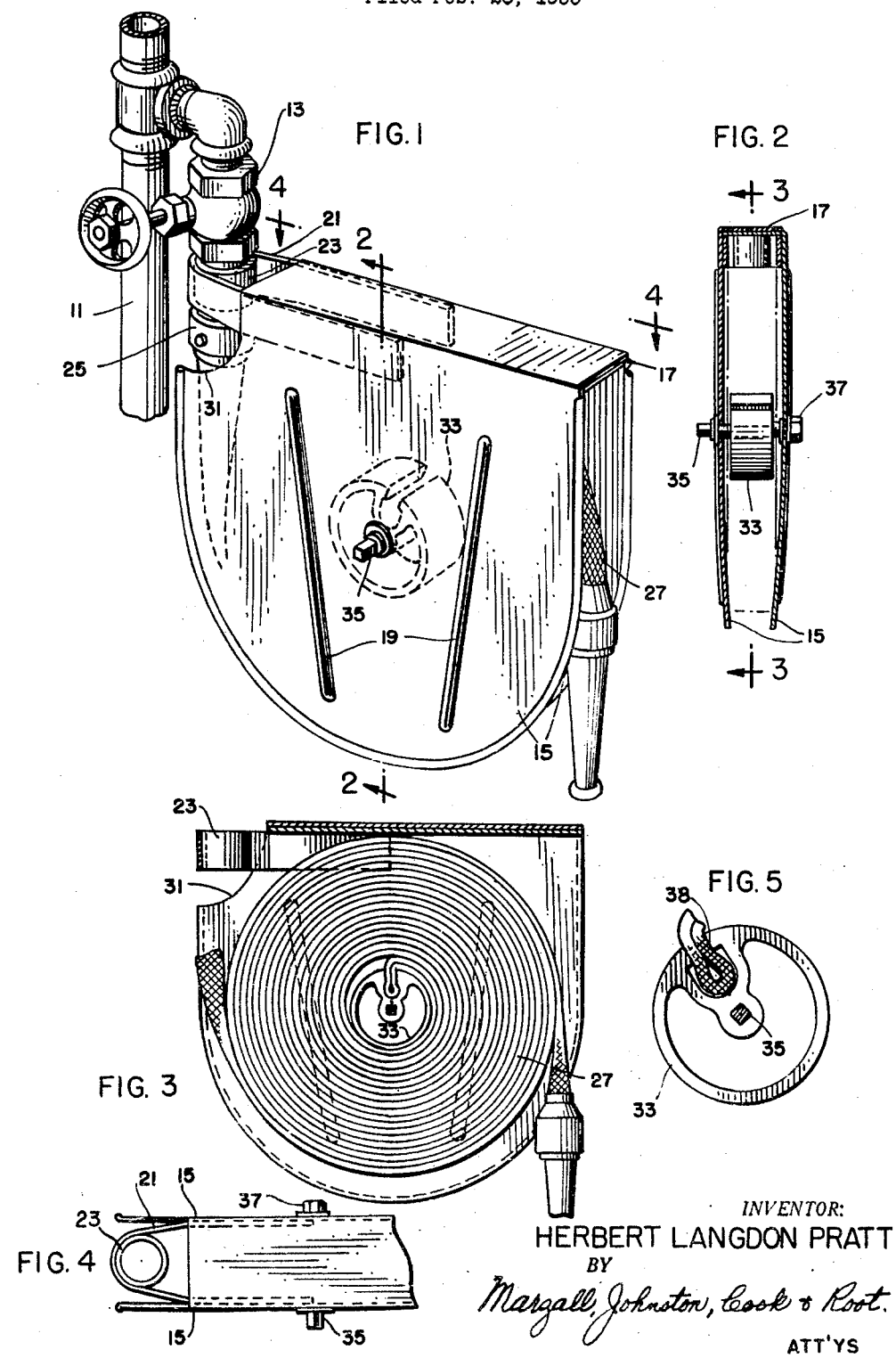

2,815,180

HOSE REEL AND GUARD

Herbert Langdon Pratt, Pasadena, Calif., assignor to W. D. Allen Manufacturing Co., Chicago, Ill., a corporation of Illinois Application February 28, 1955, Serial No. 490,991

1 Claim. (Cl. 242—86.1)

This invention relates to devices for storing fire hoses and the like, and more particularly to reels for mounting coiled hoses to water standards.

It is an object of this invention to provide an improved hose reel and cover for storing a fire hose when not in use.

It is a further object of this invention to provide a protective guard or cover for a fire hose reel which will restrain the coiled hose therein and thereby prevent the unintentional unreeling of said hose.

Another object is to provide an improved hose reel and guard which is economical to manufacture.

According to this invention, a fire hose is coiled about a center hub which is rotatably mounted between two flat guard members. The guard members engage each other at their upper extremities in a channel type construction which holds them essentially parallel with a fixed spacing at the top. A center pin extending through both side members and through the hub provides an axis upon which the hub may rotate. This pin has a threaded end and is fitted with a lock nut which may be tightened against the side guard members. The guard members may thus be drawn together at their centers and at their lower extremities, and may then pinch or impinge upon the hose which is coiled between them. The amount of impingement upon the coiled hose is controllable by adjusting the lock nut, and the coiled hose may thereby be secured against ordinary vibration and jostling.

A more complete understanding of the present invention, its mode of operation and its advantages may be gathered from further reading of this specification together with an inspection of the accompanying drawing, in which:

Figure 1 is a pictorial view of the hose storage reel and guard as disclosed in this invention;

Figure 2 is a section along the line 2—2 of Figure 1 and shows the channel construction holding the two guard members, the inner hub and the center shaft with a lock nut;

Figure 3 is a section along the line 3—3 of Figure 2 and shows the manner in which a fire hose may be coiled about the center hub and the manner in which the entire assembly is supported;

Figure 4 is a section along the line 4—4 of Figure 1 and shows the construction of the supporting bracket for the guard members; and Figure 5 shows the construction of the hub and the manner that a fire hose may be attached thereto.

In the various views of the drawing the same elements are designated by the same reference numerals.

Referring again, but in more detail, to the drawing, there is shown a hose reel and guard assembly as it may be mounted to a water standard 11 with a cut off valve 13. The hose guard is formed by two flat side members 15, each of which is bent to an angle 90° at its upper extremity. These members are welded together at the top forming a channel type construction 17. To stiffen the side guards 15 one or more ribs or flutes 19 may be stamped into the sides in the process of their manufacture.

A mounting bracket 21 is fastened by welding or other means to a collar 23 which is adapted to fit about the water supply pipe at a point between the valve 13 and a hose connection 25. The normal spacing between the parallel side guards 15 is determined by the channel construction 17 and is such to conveniently contain a coiled fire hose 27. A portion of the side guards is cut out at 31 to permit the use of a wrench upon the hose connection 25 and to avoid interference between the side guards 15 and the hose connection 25 which may be of greater diameter than the spacing between the side guards.

A hub 33 is rotatably mounted in the center between the side guard members for the purpose of coiling the fire hose. This hub 33 is mounted upon a shaft 35 with a square shank to which a crank may be attached for turning the hub and for coiling the hose.

The shaft 35 has one threaded end upon which a lock nut 37 is fitted. By tightening the lock nut 37 the two side guard members 15 may be compressed or drawn together. Since the spacing between the guard members at the top is determined by the channel construction 17, the tightening of the lock nut 37 will force the central portions and the lower extremities of the guard members 15 more closely together, thereby impinging upon the coil of hose 27 therein. The amount of compression or pinching exerted upon the coil 27 may be controlled through the tightening of the lock nut 37 and may be adjusted to the point where the normal weight of a hose nozzle, ordinary vibrations or an ordinary amount of jostling of the hose guard will not permit the hose to be released and cause to unreel unintentionally. On the other hand, the pinching or compression against the hose may not be so great to prevent its quick unreeling in an emergency situation.

The hub 33 is providde with a formed slot 38 which will grasp a portion of the fire hose and permit it to be conveniently coiled. The width or axial dimension of the hub 33 must be less than the spacing between the side guards 15 to permit the side guards to be drawn together and effectively impinge upon the coiled hose.

Because the two guard members 15 are joined in the channel construction 17, a complete cover is afforded to protect a stored hose from dust and the like. Since the construction of the side guards, the mounting bracket, the slotted hub and the guard-clamping shaft are all relatively simple, the entire device enjoys the advantage of being economical to manufacture.

Changes may be made in the form, construction and arrangement of the parts without departing from the spirit of the invention or sacrificing any of its advantages, and the right is hereby reserved to make all such changes as fall fairly within the scope of the following claim.

I claim:

A guard for a hose reel comprising two side members, each of which is bent substantially at right angles at its upper extremity, said side members being overlapped and joined at their upper extremities in a channel construction holding said side members in substantially parallel relation to each other, a shaft extending through said side members at substantially a central location, means associated with said shaft for adjustably clamping said side members and drawing them together into closer proximity, said side members being shaped to substantially enclose a coiled hose, said side members being operative by said clamping means to impinge upon a coil of hose therebetween and frictionally retain it against uncoiling.

References Cited in the file of this patent

UNITED STATES PATENTS

| | | |
|---|---|---|
| 1,340,710 | Graham | May 18, 1920 |
| 1,890,823 | Nuhring | Dec. 13, 1932 |
| 2,001,780 | Fry | May 21, 1935 |
| 2,066,405 | Knowlton | Jan. 5, 1937 |